Dec. 28, 1943.                T. BROWN                    2,337,637
                              POWER LIFT
                         Filed Nov. 17, 1941
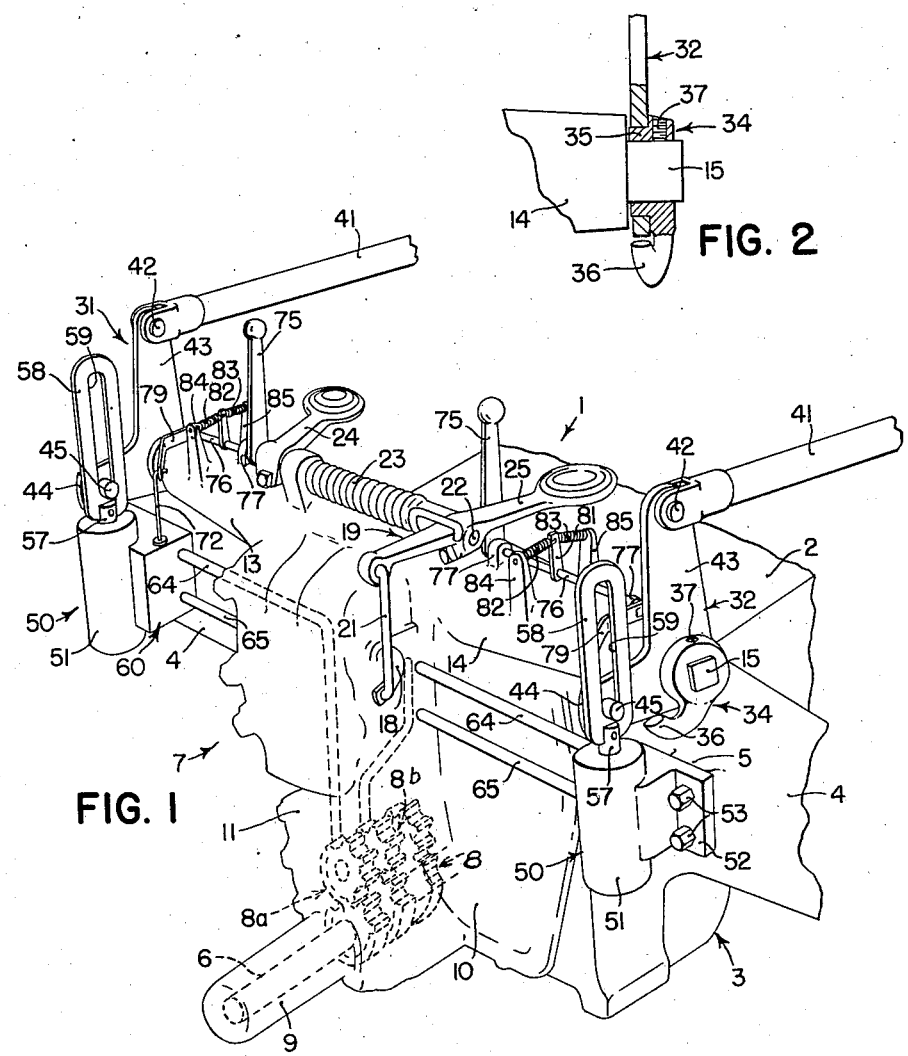
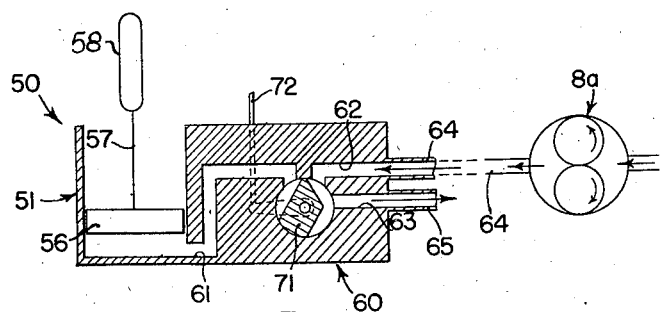
INVENTOR
THEOPHILUS BROWN
BY
ATTORNEY Patented Dec. 28, 1943

2,337,637

UNITED STATES PATENT OFFICE 2,337,637

POWER LIFT

Theophilus Brown, Moline, Ill., assignor to Deere & Company, Moline, Ill., a corporation of Illinois Application November 17, 1941, Serial No. 419,428

2 Claims. (Cl. 97—50)

The present invention relates generally to agricultural machines and more particularly to tractor-actuated power lift mechanisms by which various implement parts and/or tools may be lifted and raised or otherwise controlled by power derived from the tractor.

The object and general nature of the present invention is the provision of a power lift mechanism wherein one unit may be utilized for actuating both of a pair of implement controlling parts and either of two separate individually operable units may be optionally controlled for effecting a further individual control. It is a further feature of this invention to provide, in connection with a first power lift unit for operating two implement controlling parts, a pair of separately operable units, preferably hydraulically operated, which serve as means limiting the movement of either of the implement controlling members in its return direction. Further, it is another feature of this invention to provide biased valve controlling means for said individual units whereby either of said individual units may be operated independently of the main power lift mechanism.

These and other objects and advantages of the present invention will be apparent to those skilled in the art after a consideration of the following detailed description, taken in conjunction with the accompanying drawing in which a preferred form of the present invention has been illustrated.

In the drawing:

Figure 1 is a perspective view of the rear portion of a tractor in which power lift mechanisms constructed according to the principles of the present invention has been incorporated;

Figure 2 is a fragmentary sectional view showing the manner of connecting one of the implement controlling members with the transverse rock shaft of the main power lift mechanism; and Figure 3 is a schematic diagram illustrating one way of effecting a hydraulic control for the individual power operated auxiliary units.

Referring now to the drawing, the reference numeral 1 indicates a farm tractor which comprises a combined crank case and supporting structure 2 to which a rear axle housing 3 is secured. The rear axle housing 3 includes laterally directed housing sections 4 each of which is formed with an attaching boss 5, adapted to receive implements and other parts as desired. A hydraulic mechanism, indicated in its entirety by the reference numeral 7, is bolted over the rear opening of the axle housing 3 and preferably is of substantially the same construction as shown and claimed in United States Patent No. 2,107,760, issued February 8, 1938, to E. McCormick et al., to which reference may be had if desired. Briefly, the hydraulic mechanism 7 includes a pump unit 8, serving as a source of fluid pressure, driven by suitable connections to the power take-off shaft 6 extending rearwardly from the rear axle housing and enclosed in a protecting tube 9. Preferably, the pump 8 is of the gear type and is enclosed within a housing 11 which forms a part of the hydraulic power unit 7. The upper part of the housing 11 is formed with lateral extensions 13 and 14 in which a transverse rock shaft 15 is mounted for rocking movement. Disposed within the housing 11 is a piston and cylinder unit operatively connected with the rock shaft 15 for moving the same from one position to another, substantially as disclosed in said prior patent. Preferably, the outer ends of the rock shaft 15 are squared, and the rocking of the shaft 15 is under the control of valve mechanism that is actuated by a crank arm 18 extending laterally outwardly of the upper portion of the housing 11. A trip lever 19 is mounted by suitable supports on the upper part of the housing 11 and is connected by a link 21 with the valve arm 18. The trip lever 19 is secured to a rock shaft 22 about which a spring 23 is disposed. The left end of the shaft 22 carries a foot pedal 24, and the trip lever 19 is also formed with a second foot pedal 25. The spring 23 normally biases the trip lever 19 to take the position shown in Figure 1, and the valve mechanism is so constructed and arranged that in this position the rock shaft 15 is permitted to rock in a counterclockwise direction, as viewed from the right side of the machine, to its limit of movement. Stepping on either of the foot pedals 24 and 25 actuates the valve mechanism to cause the rock shaft to be rocked in a clockwise direction, this being the raising movement of the rock shaft. Stepping on either of the foot pedals 24 and 25 a second time permits the rock shaft 15 to return to its original position.

According to the principles of the present invention, a pair of bell cranks 31 and 32 are mounted loosely on the ends of the rock shaft 15, and to this end I provide a pair of rock shaft arms 34 each of which, as best shown in Figure 2, is provided with a hub section 35 on which the associated bell crank is mounted for rocking movement. Each arm member 34 is provided with an extension 36 that is adapted to engage one of the arms of the associated bell crank whereby rocking movement of the rock shaft 15 in one direction causes the extensions 36 of the two lifting arms 34 to engage the associated bell cranks 31 and 32 so as to rock the bell cranks with the rock shaft 15. Any suitable means, such as a set screw 37 may be utilized for fixing each of the lifting arms 34 to the associated end of the rock shaft 15.

For purposes of illustration, I have shown in Figure 1 a pair of cultivator lifting pipes 41 which normally extend along the sides of the tractor for the purpose of lifting and lowering cultivator rigs connected with the tractor. The cultivator construction may be like that shown in United States Patent No. 2,033,380, issued March 10, 1936, to Theodore W. Johnson. According to the present invention, the rear ends of the cultivator push pipes 41 are connected, as by pivot pins 42, to the upwardly extending arm 43 of the bell cranks 31 and 32. The bell cranks also have rearwardly extending arms 44 which carry studs 45. Each of the bell cranks 31 and 32 is mounted for rocking movement on the ends of the rock shaft 15 by the means shown in Figure 2 and described above. The lifting extension 36 of each lifting arm 34 contacts the rearwardly extending bell crank arm 44, as best shown in Figure 1.

A pair of auxiliary hydraulic units, each indicated in its entirety by the reference numeral 50 in Figure 1, is mounted on the rear axle 3. To this end, each of the auxiliary hydraulic units includes a casing 51 having a lateral extension 52 apertured to receive attaching studs 53 that are threaded into tapped openings in the rear axle attaching pads or bosses 5. The two housings 51 are substantially identical except that one is a right-hand unit and the other is a left-hand unit, and each is formed with a cylinder disposed generally vertically in which a piston moves, there being a piston rod 57 connected to each piston as in conventional construction. In Figure 3, the piston is indicated by the reference numeral 56. Each housing 51 also includes a valve chamber indicated in its entirety by the reference numeral 60, in which suitable valve mechanism is provided. The hydraulic units 50 are of generally conventional construction and hence it is not necessary to show the particular parts thereof in detail. It will be sufficient to note from Figure 3 that the valve mechanism 60 includes a passage 61 leading to the bottom of the cylinder 51, a high pressure passage 62 and a low pressure passage 63. As best shown in Figure 1, these passages are connected through conduits 64 and 65 with the tractor power lift mechanism 7, the low pressure conduits 65 communicating with the sump of the tractor power lift mechanism, which is formed in a housing 10 that forms a part of the tractor power lift 7. A pair of separate pumps 8a and 8b are provided, both connected with the power take-off shaft 6. One of the conduits 64 lead to the high pressure side of the pump 8a and the other conduit 64 leads to the high pressure side of the other pump 8b, as shown in Figure 1. Each of the separate units 50 includes a controlling valve which is indicated in Figure 3 by the reference numeral 71 and is operated by a rod 72 that extends outwardly of the casing of the valve mechanism 60.

Each of the valve mechanisms 60 is controlled by a separate lever, indicated in Figure 1 by the reference numeral 75. This lever is fixed to a shaft 76 that is supported, as by brackets 77, on the rock shaft housing extension at that side of the tractor. A valve operating arm 78 is fixed to each rock shaft 76 and has its outer end connected with the associated valve operating rod 72. An arm 81 is fixed to each of the rock shafts 76 and is connected to a pair of springs 82 and 83, the outer ends of which are anchored to lugs 84 and 85 carried by the rock shaft housing extension. The purpose of the two springs 82 and 83 is to hold the associated valve member 71 in neutral position, which is the position shown in Figure 3.

The operation of the construction described above is as follows.

When the farmer desires to raise both of the cultivator rigs associated with the push pipes 41, he steps on either of the foot pedals 24 and 25, which actuates the power lift mechanism 7 and causes the rock shaft 15 to rock in a clockwise direction, thereby swinging both of the bell cranks 31 and 32 in that direction and pushing forwardly on both of the push pipes 41. When the farmer desires to lower both of the cultivator rigs, he again steps on either of the foot pedals 24 and 25, and the weight of the cultivator rigs causes them to move downwardly, the push pipes 41 moving rearwardly and both of the bell cranks 31 and 32 swinging in a counterclockwise direction. The amount of swinging movement of the bell cranks 31 and 32 in this direction is determined by the positions of the piston rods 57 of the hydraulic auxiliary units 50. That is, each bell crank swings in a counterclockwise direction until the stud 45 engages the bottom of the slot 59 in the associated link 58. In other words, the auxiliary hydraulic units 50 serve as individual stops for separately controlling the lowered or return position of the two bell cranks 31 and 32. Considering these auxiliary units as stops, they are adjustable, both when the bell cranks are rocked in a clockwise direction to raise the cultivator rigs and when the rigs are in their lowered position, with the pins 45 resting in the bottoms of the slots 59. To adjust the lowered position of either rig, all that the operator has to do is to move the valve lever 75 of the associated auxiliary hydraulic unit in one direction or the other, according to whether it is desired to increase or decrease the penetration of the rigs. For example, assume that it is desired to raise the piston 57 of the right-hand hydraulic unit 50 (Figure 1): the operator pushes forward on the valve control lever 75, and this raises the valve link 72, which turns the valve 71 closing off communication between the high and low pressure passages 62 and 63 and opening communication between the high pressure passage 62 and the passage 61 leading to the cylinder 51. This causes fluid to be directed into the cylinder and raises the piston and piston rod 57, thereby raising the associated link 58. When the latter has been raised to the desired extent, the farmer returns the lever 75 to its neutral position, which again opens communication between the high and low pressure passages 62 and 63 and locks the fluid within the cylinder 51. On the other hand, if the farmer should desire to lower the link 58, thereby lowering the stop or the stud 45 of the associated bell crank, the farmer moves the valve controlling lever 75 rearwardly, thus turning the valve 71 into a position in which communication is established between the cylinder passage 61 and the low pressure passage 63, the high pressure passage 62 also communicating with the low pressure passage 63. The weight of the parts then causes the piston to move downwardly in the cylinder to the desired point, at which time the farmer returns the valve lever 75 to neutral position which again locks the remaining fluid in the cylinder and maintains communication between the high and low pressure passages. Ordinarily, all that the farmer has to do to return the valve lever 75 to neutral position is to release it, since the springs 82 and 83 act to hold the valve lever in neutral position and therefore also act to return it automatically to neutral position whenever the valve lever is released.

It will be noted that the two auxiliary hydraulic units 50 serve as independent means separately controlling the bell cranks 31 and 32. Also, it will be noted that the hydrauic units 50 may be utilized as means for raising both of the cultivator rigs instead of the tractor power lift mechanism 7, and this may be done by moving both of the valve levers 75 forwardly. Moreover, the tractor power lift mechanism 7 may be actuated to swing both of the bell cranks 31 and 32 forwardly, and then, if it should be desired subsequently to lower only one of the cultivator rigs, the hydraulic unit 50 associated with the other rig may be actuated by moving its valve lever 75 forwardly to raise the piston 57 of that unit through its full extent, whereby when the hydraulic power lift unit 75 is operated to permit the rock shaft 15 to rock rearwardly, only the other cultivator unit will be lowered, and its position will be determined by the position of the other auxiliary hydraulic unit 50. Then, the first cultivator rig may subsequently be lowered by moving the valve lever 75 of the associated auxiliary hydraulic unit rearwardly, thus permitting the rig to lower to the desired point. From this it will be seen that the present invention is admirably adapted to secure what is termed a delayed lift control for cultivator rigs or other tools, which is an advantage when operating on point rows. The provision of the auxiliary hydraulic units also makes it possible for the farmer to raise the cultivator rigs or other tools as slowly as desired, as by opening the valves only a small amount. It will be understood, of course, that the present invention is not necessarily limited to the control of cultivator rigs, since any other tools that may be connected with the bell cranks 31 and 32 may be controlled in a similar manner. For example, two-way plows may be mounted on the tractor and controlled individually by the auxiliary hydraulic units 50.

While I have shown and described above in connection with the accompanying drawing the preferred form of the present invention, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural machine having a source of power, a pair of tool moving members, power means deriving power from said source for moving both of said members at the same time, and separate power means including a pair of separate pumps and separately actuable controlling valve units, one for each of said pumps, for moving said members individually.

2. A tractor comprising a power take-off shaft and a power operated hydraulic unit, a transverse rock shaft adapted to be rocked in at least one direction by said power unit, operating members having a one-way connection with said transverse rock shaft whereby movement of the latter in one direction actuates said members, and a pair of hydraulic units, each including a pump driven from said power take-off shaft, for separately controlling said members.

THEOPHILUS BROWN.